Nov. 13, 1962　　A. G. BODINE　　3,063,143
METHOD OF SHAFT JOINING
Filed Aug. 19, 1957
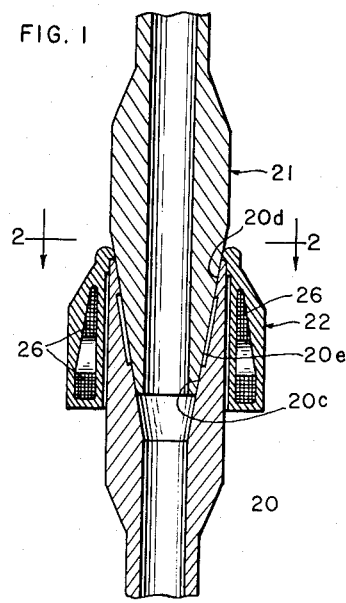
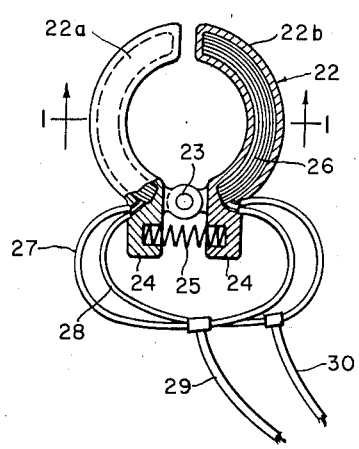
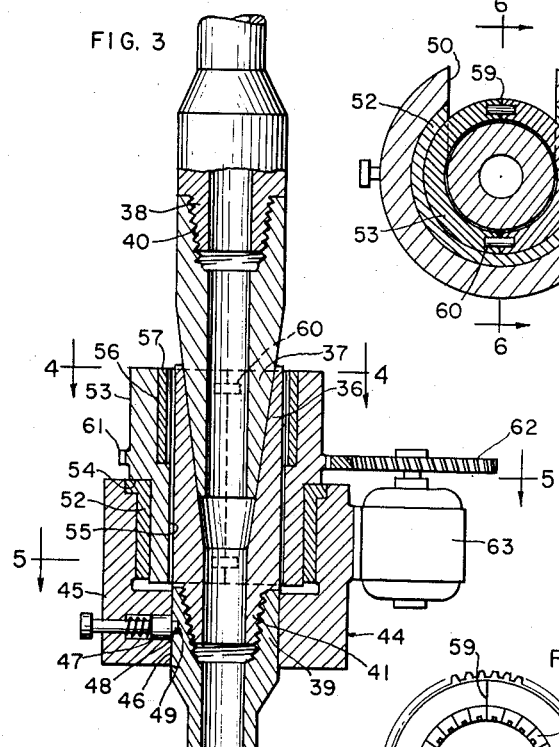
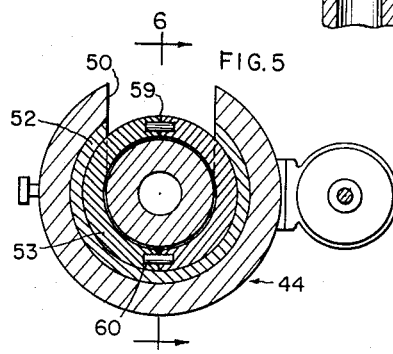
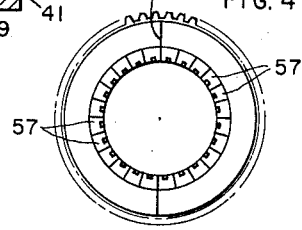
INVENTOR.
ALBERT G. BODINE
BY
ATTORNEY

United States Patent Office 3,063,143
Patented Nov. 13, 1962

3,063,143
METHOD OF SHAFT JOINING
Albert G. Bodine, 13120 Moorpark St., Van Nuys, Calif.
Filed Aug. 19, 1957, Ser. No. 678,905
4 Claims. (Cl. 29—447)

This invention is concerned with threadless joints for long transmission shafting, such as, but not limited to, joints employed in oil well drilling string. The invention is also applicable to other types of shafting such as long transmission shafts employed in factories and mines for delivering rotating power to various machines.

Most shaft joints employ some type of screw thread, typically in the form of a single large thread like a pipe thread. Thus, in a so-called drill pipe tool joint, a taper threaded "pin" is screwed into a taper threaded socket or "box." As a second familiar example may be mentioned shaft flanges secured by nuts and bolts. Threaded structures, however, are very fatigue sensitive, especially if the threads are subject to wear owing to repeated making and unmaking of the joint.

A primary object of the present invention is accordingly the provision of a threadless shaft joint and a method and apparatus for rapidly making and unmaking the same.

The broad concept of the invention concerns the making and unmaking of box and pin joints by employing methods and apparatus for swelling momentarily the box or socket member of the joint while the pin member is inserted or removed therefrom. A further preferred feature consists in introducing into the joint, between the pin and box, a multiplicity of fine abrasive particles, such as tungsten carbide powder. When the outside or box member is shrunk onto the pin member, the fine abrasive particles function as minute keys to lock the joint members together. Not only tapered joints, but stepped or other box and pin joints are susceptible to the method and apparatus of the invention. A further concept in accordance with the invention is a selective swelling of the box coupling member, such that the pin member remains substantially of its initial dimensions, whereby the box and pin joint members may be readily coupled or uncoupled. A further concept is that the box member is elastically swelled or expanded, without exceeding its elastic limit, such that when the swelling influence is terminated, the box member will contract tightly about the pin member. A still further characteristic of the invention is to provide within the expanded box member a stress gradient of maximum value at the outer periphery, decreasing inwardly.

A typical and preferred form of the invention involves the use of magnetic fields for momentary induction heating of the box member. Alternating fields of fairly high frequency, as in the range of 10,000 cycles per second, may be employed, Such fields penetrate the coupling only to a shallow extent, causing eddy current flows in the outer regions of the box coupling member, as well as hysteresis losses, and corresponding heating thereof. The eddy currents do not penetrate inwardly to the region of the pin coupling member, and the latter is not heated. The induction heating is discontinued before the pin coupling member can be heated by conduction heat flow. The temperature gradient, and therefore the stress gradient, is a maximum in the outer periphery of the box coupling and decreases radially inward. Such a joint can be readily made, with the box member heated as described, by simply forcing the two coupling members together; and the coupling may be subsequently unmade by simply pulling the coupling members apart with the outside or box member heated and elastically expanded, as described. The invention will be further understood from the following detailed description of a number of illustrative embodiments thereof, reference for this purpose being had to the accompanying drawings, in which:

FIG. 1 is a longitudinal sectional view through a coupling and a coupling making device in accordance with the invention, the view being taken in accordance with line 1—1 of FIG. 2;

FIG. 2 is a section taken on line 2—2 of FIG. 1;

FIG. 3 is a longitudinal sectional view through a modified form of the invention;

FIG. 4 is a section line taken on line 4—4 of FIG. 3;

FIG. 5 is a section taken on line 5—5 of FIG. 3; and

FIG. 6 is a section taken on line 6—6 of FIG. 5.

In FIGS. 1 and 2, numerals 20 and 21 designate, respectively, the tapered box and pin members of a tool joint such as conventionally employed in coupling adjacent stands of drill pipe. The tapered surface of the box member may be optionally circumferentially grooved, as at 20e, leaving two engaging lands at 20d and 20c. An induction heating apparatus 22 in accordance with the invention is shown to be clamped about the box coupling member 20. As here shown, the apparatus 22 is in two arcuate halves 22a and 22b, hinged to one another at 23, and provided outwardly of the hinge, with lugs 24 normally forced apart by a coil compression spring 25. To engage the apparatus with the coupling, the two halves 22a and 22b are spread apart, spring 25 being compressed, sufficiently to pass around the coupling. The spring 25 then closes the two halves 22a and 22b snugly on the coupling, as shown.

The two halves 22a and 22b of the induction heater may be phenolic castings, in which are imbedded current carrying coils 26. The coils are wound so that when electrically energized, magnetic fields are created which penetrate the box coupling member 20, and thereby cause induction heating of the latter by reason of eddy currents and hysteresis loss. Preferably the coil may be formed in a somewhat tapered form, so as to produce a more concentrated field in the thicker wall regions of the tapered box coupling member 20, this being conducive to uniform distribution of induction heat within the box coupling member 20 from top to bottom. The two coils 26 are connected in parallel by leads 27 and 28, and across power supply leads 29 and 30.

To obtain the above-described temperature gradient, the power supply is preferably at a somewhat elevated frequency, as 10,000 cycles per second. A high-frequency rotary alternator is especially effective as a power source, as it will supply a high surge of power if a flywheel is combined with its drive shaft. With increasing frequencies, of course, the magnetic field penetrates less and less into the walls of the box coupling member, with the result that the outer regions of the box coupling are most highly heated, and most expanded. Thus a temperature gradient is established in the box coupling member, with maximum temperature in the outer periphery, and the temperature falling off radially inward. The highest elastic stress (compressive in this case) similarly occurs in the outer peripheral region of the box coupling, and decreases inwardly.

To make up the coupling, the induction heating apparatus is engaged about the box coupling member 20, the pin coupling member 21 is seated therein, and the current coils 26 are then energized. The box coupling member is thereupon rapidly heated, the heat being a maximum at its outer periphery and tapering off inwardly. At this time, the box coupling member tending to swell or expand owing to its heating, the pin and box members are quickly forced together, using any suitable or appropriate method or apparatus for the purpose. I prefer to do this by disposing the coupling elements in a vertical position, as in FIG. 1, fixedly supporting one of the coupling members, for example, the box member, using any support means, engageable either with the box or the pipe length below, and then suddenly imposing the weight of the upper coupling member, together with the pipe length joined thereto, on the lower coupling member. Sufficient expanding force is thereby very readily obtained. Before the heat induced in the box coupling member has time to flow by conduction to and into the pin 21, so as to cause the latter to swell also, the coils 26 are de-energized, and the heating apparatus removed from the coupling. The box coupling member is thereby radially expanded, and upon cooling, elastically contracts very tightly about the pin member 21, so as to afford a secure and dependable coupling joint. It is highly desirable, and a feature of the invention, that the box coupling member not be expanded beyond the range of its elastic limit.

According to a preferred practice of the invention, a quantity of a hard abrasive powder or grit, for example, tungsten carbide, may be introduced between the joint members before they are brought together. For example, magnetized tungsten carbide particles may be brushed or blown onto the surfaces of the pin and/or box, and will stick in place until the members are brought together. When the joint is made up, as above described, these grit particles imbed themselves into the surfaces of the pin and box, so as to act as locking keys, and greatly increase the coefficient of friction between these surfaces. An extremely light joint is thereby attained. Upon subsequently uncoupling the joint, the particles remain imbedded, some in the pin, and some in the box, and are available as keying elements, the next time the joint is made up. Other abrasives can be used, such as aluminum oxide. The abrasives may be applied by use of a thin, tacky coat of varnish. They can either be incorporated in the varnish before the varnish is applied, or sprinkled over the varnish-covered surface. As will become apparent hereinafter, such abrasive particles or grit may be used with any of my forms of coupling.

To unmake the joint, the induction heating apparatus 22 is re-engaged with the coupling, the coils 26 energized, and the box coupling member selectively expanded, as before. At this time, the coupling members 20 and 21 are pulled apart, and owing to the selective expansion of the box member, are readily parted.

FIGS. 3 through 6 show a form of my invention wherein the eddy currents for heating the box member of the coupling are generated by rotating a group of permanent magnets at high speed around the box coupling member. In this case, I have chosen to illustrate an application of the invention wherein a tool joint composed of tapered box member 36 and pin member 37 is employed between the upper threaded pin member 38 and lower threaded box member 39 of a conventional tool joint. Thus, the upper end of pin member 37 is formed with a threaded box 40 joined to pin 38, and the box member 36 formed with a lower threaded pin member 41 screwed into box 39. In such a case, the threaded coupling members may be made up but once in the life of the tool string, whereas the smooth tapered members 36 and 37 may be made up and unmade a multiplicity of times during the life of the equipment.

The induction heating apparatus is in this case designated generally by numeral 44, and includes a lower casing member 45 having a central bore 46 adapted to snugly receive the box coupling member 36 and the box member 39 joined to the latter. For purpose of holding the parts in assembly, member 45 may be provided with a spring pressed plunger 47 carrying a pin 48 adapted for insertion in a socket 49 in the side of the coupling member 39. The member 45 is notched in from one side to the full diameter of the bore 46, as shown at 50, to permit the apparatus to be engaged with the coupling. Member 45 carries a similarly notched bearing bushing 52, and rotatably fitted therein is a generally cylindrical magnet carrier 53, the latter having a downwardly facing shoulder 54 which rests and turns on the upper end of bearing bushing 52. Member 53 has a bore 55 receiving the box coupling member 36 with adequate working clearance, and this bore 55 is counter-bored at the top, as indicated at 56, to receive a plurality of channel-shaped permanent magnets 57. These magnets create magnetic fields which penetrate into the opposed surface of the box coupling member 36. The magnet carrier 53 is longitudinally split into two halves along a parting plane 59, and connected by dowel pins 60, this construction facilitating assembly of the magnet carrier halves above the coupling member. A gear 61 formed around magnet carrier 53 is driven through a helical gear 62 from a suitable motor 63, either electrical, or air driven, and which may be conveniently mounted on the member 45, as herein shown.

When the magnet carrier is rotated by the motor 63, the fields of its magnets 57 rotate about the socket member 36, and in so doing, generate eddy currents therein. These eddy currents rapidly heat the box or socket member 36, and since the current flows will progressively diminish inwardly into the socket, the heating resulting from the eddy current flow is maximum at the periphery of the coupling box, and decreases inwardly. Thus, with this form of the invention, the box member is selectively heated with a temperature gradient effect similar to that described in connection with FIGS. 1 and 2, and coupling is quickly made while the member 36 is heated and before heat flows by conduction into the member 37. That is to say, the coupling is made (or unmade) while the box or socket member 36 is in a momentarily expanded condition, and before such expansion extends also to the pin member 37. It follows that a stress gradient similar to that described in connection with FIGS. 1 and 2 is also set up in the box.

Various automatic control devices may be used in many of the embodiments, including particularly FIGS. 1 to 6, a temperature sensitive switch element may be embodied in the device, designed to automatically turn off the electric power when a particular predetermined temperature is attained.

The invention has now been disclosed in a number of specific illustrative embodiments. It is to be understood that these are for illustrative purposes only, and that various changes in design, structure and arrangement may be made without departing from the spirit and scope of the broader of the appended claims.

I claim:

1. The method of coupling the members of a threadless taper pin and box shaft joint, that comprises: selectively expanding the box joint member by heating it from the outside thereof, so as to set up therein temperature and stress gradients which are at a maximum at the outer periphery and decrease inwardly, terminating the heating of the box member while said temperature and stress gradients still exist and before heat flow by conduction heating has substantially equalized the temperature of the box member from inside to outside, and while the box joint member is so selectively expanded and said temperature and stress gradients still prevail, forcing the pin joint member sufficiently deep therein to be elastically gripped upon subsequent contraction of the box member, and then allowing the expanding box member to cool and shrink to the pin member.

2. The method of coupling the members of a threadless taper pin and box shaft joint, that comprises: causing the box joint member to be penetrated from the outside by a rapidly moving magnetic field, and thereby causing eddy currents to flow which selectively heat and expand said member, with temperature and stress gradients which are at a maximum at the outer periphery, and decreases inwardly, and while the box joint member is so selectively expanded, and said temperature and stress gradients still prevail, forcing the pin joint member sufficiently deep therein to be elastically gripped upon subsequent contraction of the box member, and then allowing the expanded box member to cool and shrink to the pin member.

3. The method of coupling the members of a threadless taper pin and box shaft joint, that comprises: causing the box joint member to be penetrated from the outside by a high frequency fluctuating magnetic field, thereby causing eddy currents to flow which selectively heat and expand said member, with temperature and stress gradients which are at a maximum at the outer periphery and decrease inwardly, and while the box joint member is so selectively expanded, and said temperature and stress gradients prevail, forcing the pin joint member sufficiently deep therein to be elastically gripped upon subsequent contraction of the box member, and then allowing the expanding box member to cool and shrink to the pin member.

4. The method of coupling the members of a threadless taper pin and box shaft joint, that comprises: causing the box joint member to be penetrated from the outside by a rotating magnetic field, thereby causing eddy currents to flow which selectively heat and expand said member, with temperature and stress gradients which are maximum at the outer periphery and decrease inwardly, and while the box joint member is so selectively expanded, and said temperature and stress gradients prevail, forcing the pin joint member sufficiently deep therein to be elastically gripped upon subsequent contraction of the box member, and then allowing the expanded box member to cool and shrink to the pin member.

References Cited in the file of this patent

UNITED STATES PATENTS

| | | |
|---|---|---|
| 1,331,091 | Becker | Feb. 17, 1920 |
| 1,539,413 | Fish | May 26, 1925 |
| 1,727,755 | Dickinson | Sept. 10, 1929 |
| 1,817,808 | Eaton | Aug. 4, 1931 |
| 2,086,667 | Fletcher | July 13, 1937 |
| 2,089,790 | Halpern | Aug. 10, 1937 |
| 2,331,504 | Raymond et al. | Oct. 12, 1943 |
| 2,438,867 | Rockwell et al. | Mar. 30, 1948 |
| 2,564,670 | Bratt | Aug. 21, 1951 |
| 2,576,528 | Matthysse | Nov. 27, 1951 |
| 2,671,949 | Welton | Mar. 16, 1954 |
| 2,768,433 | O'Donnell | Oct. 30, 1956 |
| 2,787,956 | Kirby et al. | Apr. 9, 1957 |
| 2,798,141 | Longacre | July 2, 1957 |
| 2,840,399 | Harless et al. | June 24, 1958 |
| 2,912,552 | Baermann | Nov. 10, 1959 |
| 2,926,940 | Maass | Mar. 1, 1960 |

FOREIGN PATENTS

| | | |
|---|---|---|
| 477,538 | Great Britain | Jan. 3, 1938 |
| 609,718 | Great Britain | Oct. 6, 1948 |